Sept. 9, 1930.    F. P. RYDER    1,775,214
MACHINE FOR SEPARATING ARTICLES
Filed Sept. 11, 1928    3 Sheets-Sheet 1
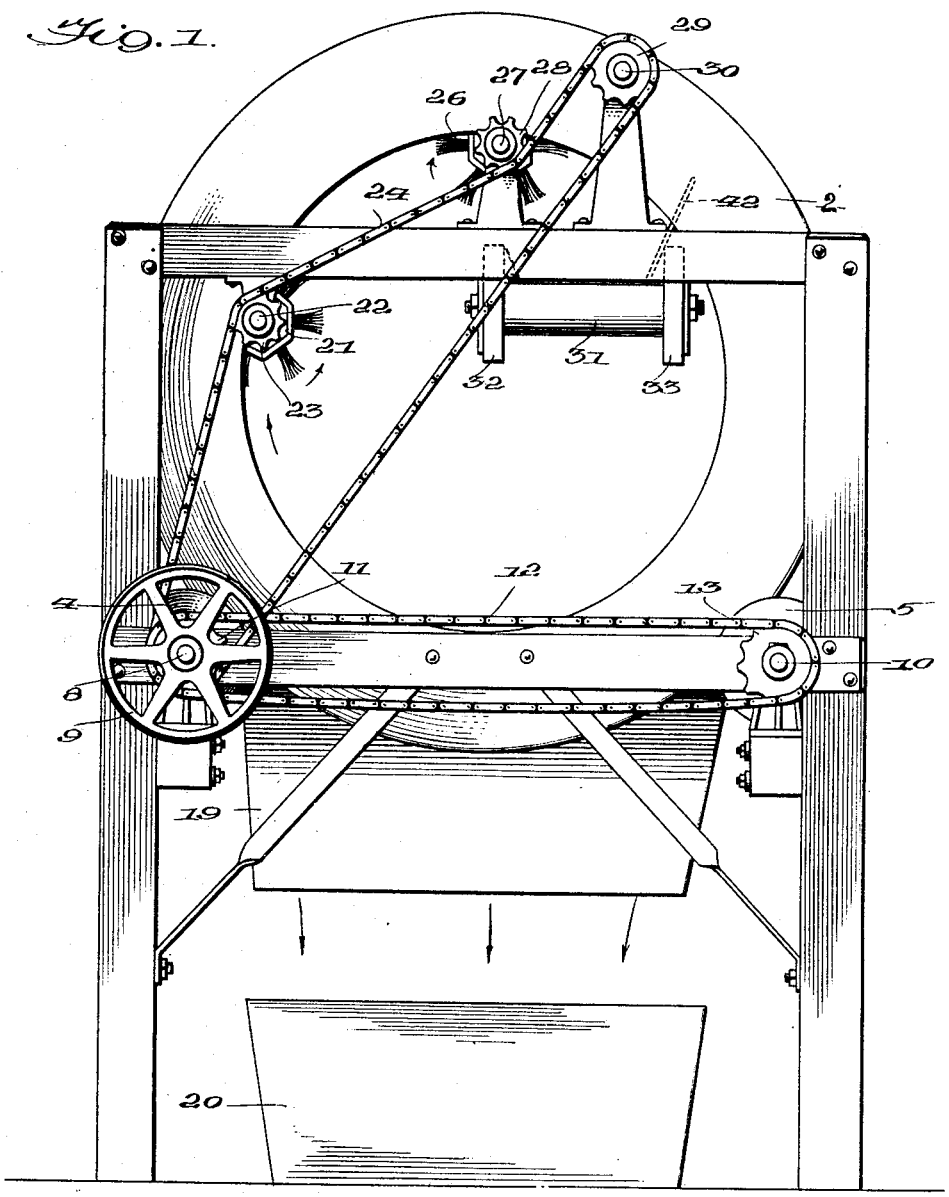

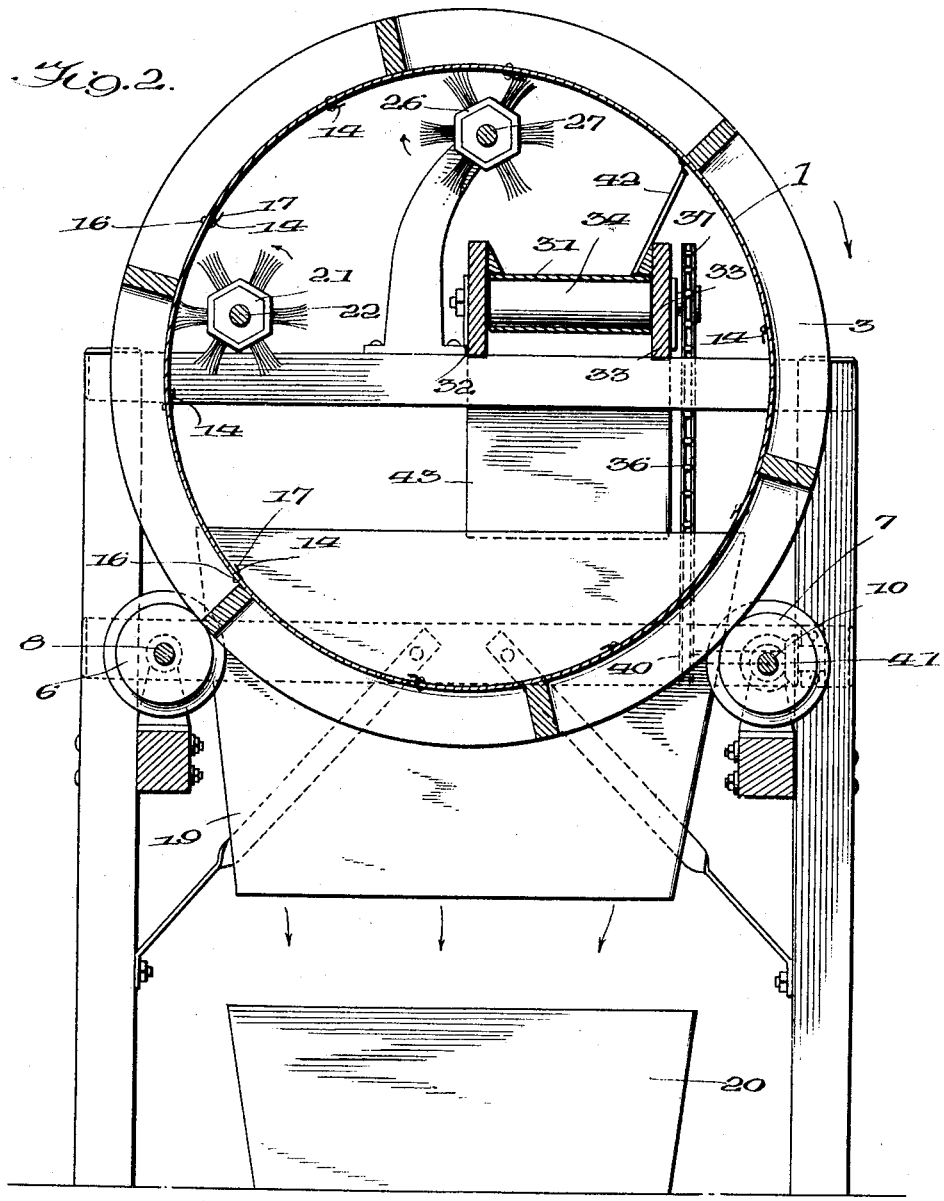

Sept. 9, 1930.                F. P. RYDER                1,775,214
                        MACHINE FOR SEPARATING ARTICLES
                        Filed Sept. 11, 1928    3 Sheets-Sheet 3
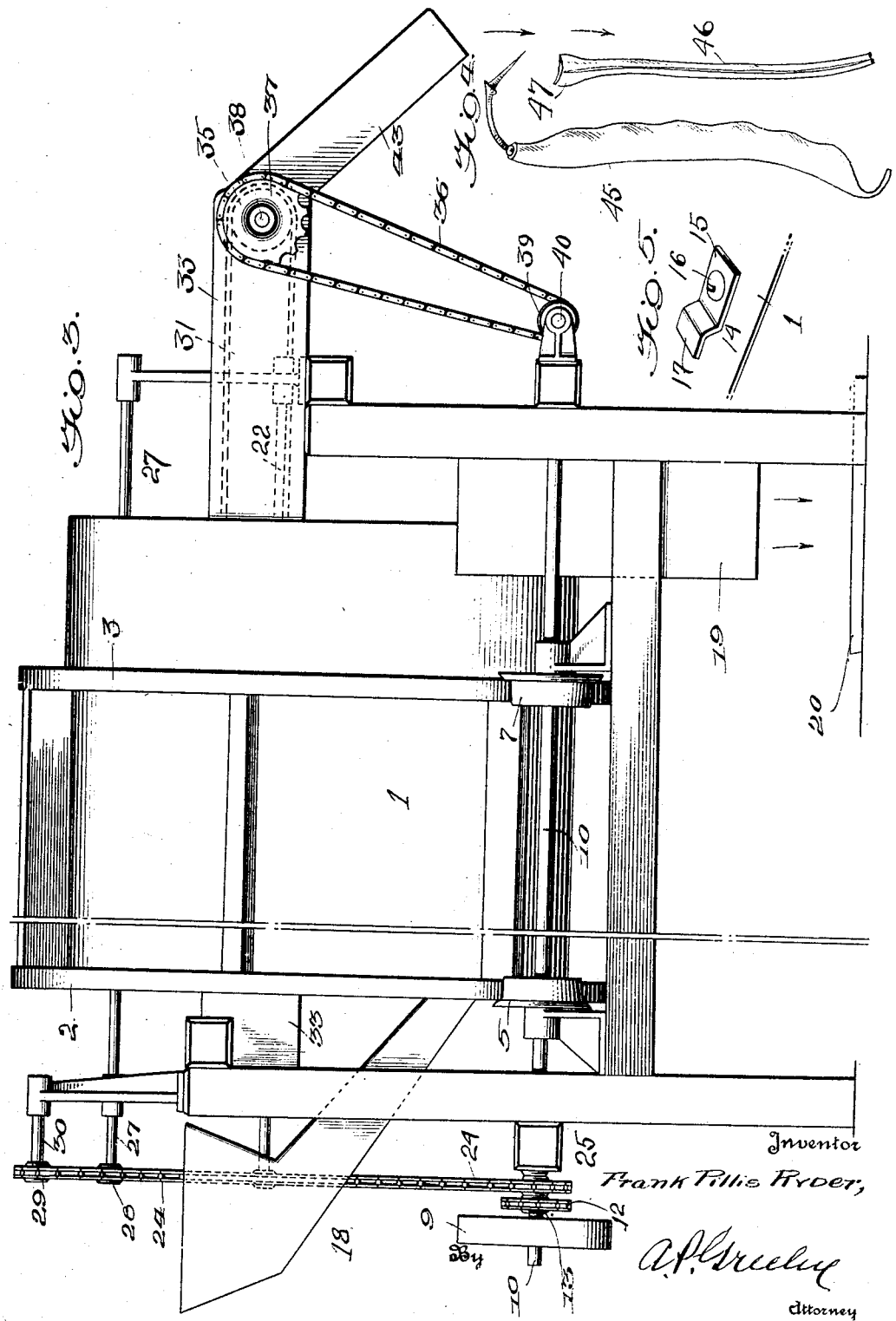

Patented Sept. 9, 1930

1,775,214

UNITED STATES PATENT OFFICE

FRANK P. RYDER, OF NIAGARA FALLS, NEW YORK

MACHINE FOR SEPARATING ARTICLES

Application filed September 11, 1928. Serial No. 305,154.

My invention relates to apparatus for separating thin articles from thicker articles and has for its object to provide an apparatus particularly adapted to separate stems or stalks of string bean bushes or vines from the string bean pods. When string beans are stripped from the bushes or vines on which they are grown by mechanical means and the leaves and stalks separated from the bean pods as described in the application for Letters Patent of the United States filed by me November 9, 1927, Serial No. 232,119, more or less of the relatively short and thin leaf stalks or stems are still present with the bean pods and must be eliminated before the bean pods are snipped and otherwise prepared for canning. These leaf stalks or stems are of slight diameter or thickness compared to the bean pods and may be of considerable length though usually shorter than the bean pods. My invention has for its object to provide means by which this difference in thickness of the stalks or stems and the bean pods may be taken advantage of to effect their separation so that the bean pods and stalks or stems may be discharged at different points. A further object of my invention is to provide means by which thin articles of any kind may be separated from thicker articles.

With the objects above indicated and other objects hereinafter explained my invention consists in the construction and combination of elements hereinafter described and claimed.

Referring to the drawings:

Figure 1 is an end view of the inlet end of a machine embodying my invention, the inlet chute being omitted.

Figure 2 is a cross sectional view of the machine shown in Figure 1 at about midway between its ends.

Figure 3 is a side view of the same.

Figure 4 is a perspective view of a bean pod and a leaf stalk or stem, and

Figure 5 is a perspective view of one of the hooks carried on the inner surface of the cylinder of the machine.

In the drawings 1 indicates a cylinder preferably of sheet metal carried by end rings 2 and 3, ring 2 resting on travelers 4 and 5 and ring 3 resting on travelers 6 and 7. Travelers 4 and 6 are carried on shaft 8 mounted in suitable bearings on the machine frame and provided with pulleys 9 to which power may be applied. Travelers 5 and 7 are carried on shaft 10 on the opposite side of the machine frame. Sprocket 11 on shaft 8 is connected by sprocket chain 12 with sprocket 13 on shaft 10 so that the travelers 4 and 6 and 5 and 7 are positively rotated to rotate the cylinder 1.

The inner surface of cylinder 1 is provided with numerous hooks 14 each hook consisting of a piece of sheet metal bent to the shape shown in Figure 4 with a portion 15 adapted to be secured to the cylinder by screw or rivet 16, and a portion 17 offset from the cylinder a distance just sufficient to permit it to engage the stems or stalks but not sufficient to permit a bean pod to get between it and the cylinder wall. An offset of nine sixty-fourths of an inch is found sufficient for satisfactory operation.

When the string beans with more or less stalks mixed with them are introduced into the cylinder rotating in the direction indicated by the arrows in Figures 1 and 2, the hooks 14 will pick up the stalks which by reason of their slight thickness will enter under offset 17 while the bean pods being too thick to enter under the offset will roll over the hooks. The rotation of the cylinder will cause the hooks to carry the stalks up to the top of the cylinder where they will be discharged so as to drop into a suitable receptacle or conveyor.

For convenience in introducing the bean pods into the cylinder a chute 18 is provided at one end and at the other end a delivery chute 19 is provided for discharging the bean pods into a suitable receptacle 20. In order to facilitate delivery the axis of cylinder 1 is inclined slightly downward towards the delivery end as indicated in Figure 3.

For the purpose of dislodging any bean pods which may be caught by the end of offset 17 a rotary brush 21 is arranged within the cylinder on shaft 22 which is located slightly above the plane of the axis of cylinder 1 and carries sprocket 23 which is driven by sprocket chain 24 driven by sprocket 25 on shaft 8, this brush 21 being so arranged that it acts against the ends of the offsets 17 to dislodge any bean pods caught by these offsets so that they will drop back towards the bottom of the cylinder. Near the top of the cylinder is arranged a second brush 26 carried on shaft 27 which is provided with sprocket 28 for engagement with sprocket chain 24, this brush 26 being so driven that it will act upon the stalks engaged by offsets 17 to drive them out from such engagement. The brush thus acts upon the stalks in the same direction in which they are carried by the rotation of the cylinder but the peripheral speed of the brush is greater than the speed of movement of the inner surface of the cylinder. This greater peripheral speed of the brush is provided for by making sprocket 28 of less diameter than sprocket 25 on shaft 8. In order to provide for rotating brush 21 in one direction and brush 26 in the opposite direction sprocket chain 24 is passed over idler sprocket 29 on shaft 30 carried in bearings on the upper part of the machine frame. Sprocket chain 24 passes from sprocket 25 to idler sprocket 29 and thence beneath 28 and over sprocket 23 and back to sprocket 25.

As the stalks are dislodged from the hooks 14 by brush 26 they fall onto conveyor belt 31 arranged within the cylinder 1 carried between longitudinal supports 32 and 33 by rollers 34 and 35, of which 35 is outside the delivery end of cylinder 1 and is driven by sprocket chain 36 engaging sprocket 37 on shaft 38 of roller 35 and sprocket 39 on cross shaft 40 which is driven by bevel gearing 41 from shaft 10. An inclined plate 42 carried by longitudinal support 33 serves to guide the stalks or stems dislodged by brush 26 from hooks 14 to the conveyor belt 31. The stalks or stems collected on conveyor 31 drop from the conveyor belt as it passes about roller 35 into chute 43 from which they fall into a suitable receptacle.

The difference between the bean pods and the stalks is shown in Figure 4 in which 45 indicates, actual size, a bean pod of the smaller size used for canning and 46 indicates a leaf stalk, actual size having at the stem end the usual enlargement 47. These stems or stalks are not usually over three and one-half inches in length and are usually less than nine sixty-fourths of an inch in thickness for the main portion of their length while the bean pods suitable for canning are more than nine sixty-fourths of an inch in thickness. The bean pods, if any, which are under the size stated may, of course, be caught by hooks 14 and carried off with the stems or stalks.

It will, of course, be understood that the spacing of the offsets 17 is not limited to the nine sixty-fourths of an inch but may be greater or less than this as may be required.

It is also to be understood that I do not desire to be limited to details of construction shown and described, particularly as regards the driving mechanism for operating the several moving parts of the machine shown.

It will further be understood that while particularly adapted and intended for separating stems or stalks from string bean pods it may be used for separating thinner articles of any kind from thicker articles, it being of course necessary to space the offset 17 of the hooks 14 from the inner surface of the cylinder the proper distance to permit the thinner articles only to enter them.

Having thus described my invention what I claim is:—

1. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder, and positively action means moving in the direction in which the hooks extend for disengaging from said offset portions the thinner articles engaged by them.

2. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder, and positively acting means moving in the direction in which the hooks extend for disengaging from said offset portions the thinner articles engaged by them comprising a brush moving in contact with the inner surface of the cylinder.

3. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder and means for disengaging from said offset portions the thinner articles engaged by them comprising a brush moving in contact with the inner surface of the cylinder at a speed greater than the speed of movement of the said inner surface of the cylinder and in the direction the hooks extend.

4. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder and means for disengaging the thinner articles engaged by them comprising a rotary brush within the cylinder having its periphery in contact with the inner surface of the cylinder, and in the direction the hooks extend.

5. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder, and means for disengaging from said offset portions the thinner articles engaged by them comprising a rotary brush within the cylinder having its periphery in contact with the inner surface of the cylinder and so rotated that its peripheral speed is greater than the speed of movement of the inner surface of the cylinder and in the direction the hooks extend.

6. In a machine for separating articles differing in thickness, a hollow cylinder mounted to rotate on a longitudinal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder, positively acting means moving in the direction in which the hooks extend for disengaging from said hooks the thinner articles engaged by said offset portions of the hooks, and means within the cylinder adapted to receive the thinner articles so disengaged.

7. In a machine for separating articles differing in thickness, a hollow cylinder mounted to rotate on a longitudinal axis having on its interior surface hooks having portions thereof extending in the direction in which the cylinder rotates and offset from the surface of the cylinder a distance corresponding to the thickness of the thinner articles and less that the thickness of the thicker articles, means for rotating the cylinder, positively acting means moving in the direction in which the hooks extend for disengaging from said hooks the thinner articles engaged by said offset portions of the hooks, and means within the cylinder adapted to receive the thinner articles so disengaged comprising a conveyor belt and means for moving it to carry said thinner articles out of the cylinder.

8. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder, means for disengaging the thinner articles engaged by said offset portions of the hooks, and means for disengaging from the ends of said offset portions any of the thicker articles carried by them.

9. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder, means for disengaging the thinner articles engaged by said offset portions of the hooks comprising a rotary brush and means for rotating it in the same direction in which the cylinder rotates but at a peripheral speed greater than the speed of rotation of the cylinder and means for disengaging from the ends of said offset portions any of the thicker articles carried by them.

10. In a machine for separating articles differing in thickness, a hollow cylinder mounted to rotate on a horizontal axis having on its interior surface hooks having portions thereof extending in the direction in which the cylinder rotates and offset from the surface of the cylinder a distance corresponding to the thickness of the thinner articles and less than the thickness of the thicker articles, means for rotating the cylinder, means for disengaging the thinner articles engaged by said offset portions of the hooks comprising a rotary brush and means for rotating it in the same direction in which the cylinder rotates but at a peripheral speed greater than the speed of rotation of the cylinder, means for disengaging from the ends of said offset portions any of the thicker articles carried by them comprising a rotary brush and means for rotating it in a direction opposite to the direction of rotation of the cylinder.

In testimony whereof, I hereunto affix my signature.

FRANK P. RYDER.